United States Patent
Bellinger et al.

(10) Patent No.: US 7,189,031 B2
(45) Date of Patent: Mar. 13, 2007

(54) TOOLHOLDER WITH INSERT CLAMP AND METHOD FOR THE SAME

(75) Inventors: John J. Bellinger, Wadsworth, OH (US); Nathan L. Goldblatt, Wilmette, IL (US); Rachel Suling Lin, Singapore (SG); James David Rene Raskob, Pittsburgh, PA (US)

(73) Assignee: Kennametal Inc., Latrobe, PA (US)

( * ) Notice: Subject to any disclaimer, the term of this patent is extended or adjusted under 35 U.S.C. 154(b) by 88 days.

(21) Appl. No.: 10/733,166

(22) Filed: Dec. 11, 2003

(65) Prior Publication Data

US 2005/0129470 A1    Jun. 16, 2005

(51) Int. Cl.
*B26D 1/00* (2006.01)
(52) U.S. Cl. .............................. 407/40; 407/41; 407/49
(58) Field of Classification Search .................. 407/40, 407/34, 41, 46, 49, 50, 51, 53, 67, 101, 102
See application file for complete search history.

(56) References Cited

U.S. PATENT DOCUMENTS

| | | | | | |
|---|---|---|---|---|---|
| 4,001,925 | A | * | 1/1977 | Eriksson | 407/107 |
| 4,309,132 | A | * | 1/1982 | Adamson et al. | 407/38 |
| 5,921,719 | A | * | 7/1999 | Laflamme | 407/40 |
| 6,116,823 | A | * | 9/2000 | Mihic | 407/40 |
| 6,481,936 | B1 | * | 11/2002 | Hecht | 407/111 |

\* cited by examiner

*Primary Examiner*—Willmon Fridie, Jr.
(74) *Attorney, Agent, or Firm*—John J. Prizzi (57) ABSTRACT

A toolholder has an insert clamp in the form of a lever that urges the top of a cutting insert into the pocket of the toolholder. The lever may be spring biased against the insert and may also be dynamically activated by rotation of the toolholder. Additionally, the lever may be on the form of a cam. A method is described of securing a cutting insert within the pocket using the lever.

21 Claims, 6 Drawing Sheets

TOOLHOLDER WITH INSERT CLAMP AND METHOD FOR THE SAME

BACKGROUND OF THE INVENTION

1. Field of the Invention

The invention is directed to a toolholder having an insert clamp and, more particularly, having a clamp in the form of a lever, such as a cam.

2. Description of Related Art

Removable or indexable cutting inserts for toolholders used for, among other things, metalworking operations, must be mounted securely within the toolholder but simultaneously must be removed when the insert becomes worn or damaged or when a different type of insert is to be inserted. Cutting inserts have in the past been secured within the pocket of a toolholder using a variety of different mechanisms. Frequently, a clamp activated by a screw is urged downwardly upon the top of the cutting insert to secure the insert within the pocket of the toolholder. Additionally, for inserts having bores extending therethrough, posts have been inserted within these bores and the post is then laterally displaced such that the insert is held firmly against the walls of the pocket within the toolholder. A third mechanism which also utilizes a bore extending through the cutting insert involves the use of a screw which extends through this bore and is threadingly engaged within the base of the toolholder pocket.

However, each of these clamping mechanisms requires the use of at least one external tool to release or to activate a clamp or to release or activate the lateral motion of a pin retaining the cutting insert. A simplified design is needed which not only secures a cutting insert within the pocket of a toolholder but, furthermore, does so in a manner that makes securing and replacing such an insert a relatively simple task.

BRIEF SUMMARY OF THE INVENTION

A toolholder comprises a body having a pocket therein for receiving a cutting insert and a lever pivotally mounted about a pivot to the body and adapted to hold the cutting insert within the pocket.

The toolholder may have a body having at least one radially extending pocket to accept a cutting insert. A cutting insert has a front face, a back face and a side wall that define a cutting edge at an intersection of the front face and the side wall, wherein the cutting insert fits within the pocket such that the cutting edge of the cutting insert protrudes from the pocket. A lever is pivotally mounted to the body through a pivot, wherein the lever is adapted to hold the cutting insert within the pocket.

A method for securing a cutting insert into the pocket of a toolholder, wherein the pocket has a floor and one or more walls and the cutting insert has a top and bottom surface, comprising the steps of positioning the cutting insert within the pocket of the toolholder such that the bottom surface of the cutting insert is against the floor and one or more walls of the pocket and rotating a lever pivotally mounted to the toolholder body to a first position against the top surface of the cutting insert to urge the cutting insert against the pocket floor and thereby secure the cutting insert within the pocket.

DETAILED DESCRIPTION OF THE INVENTION

Figure 1:
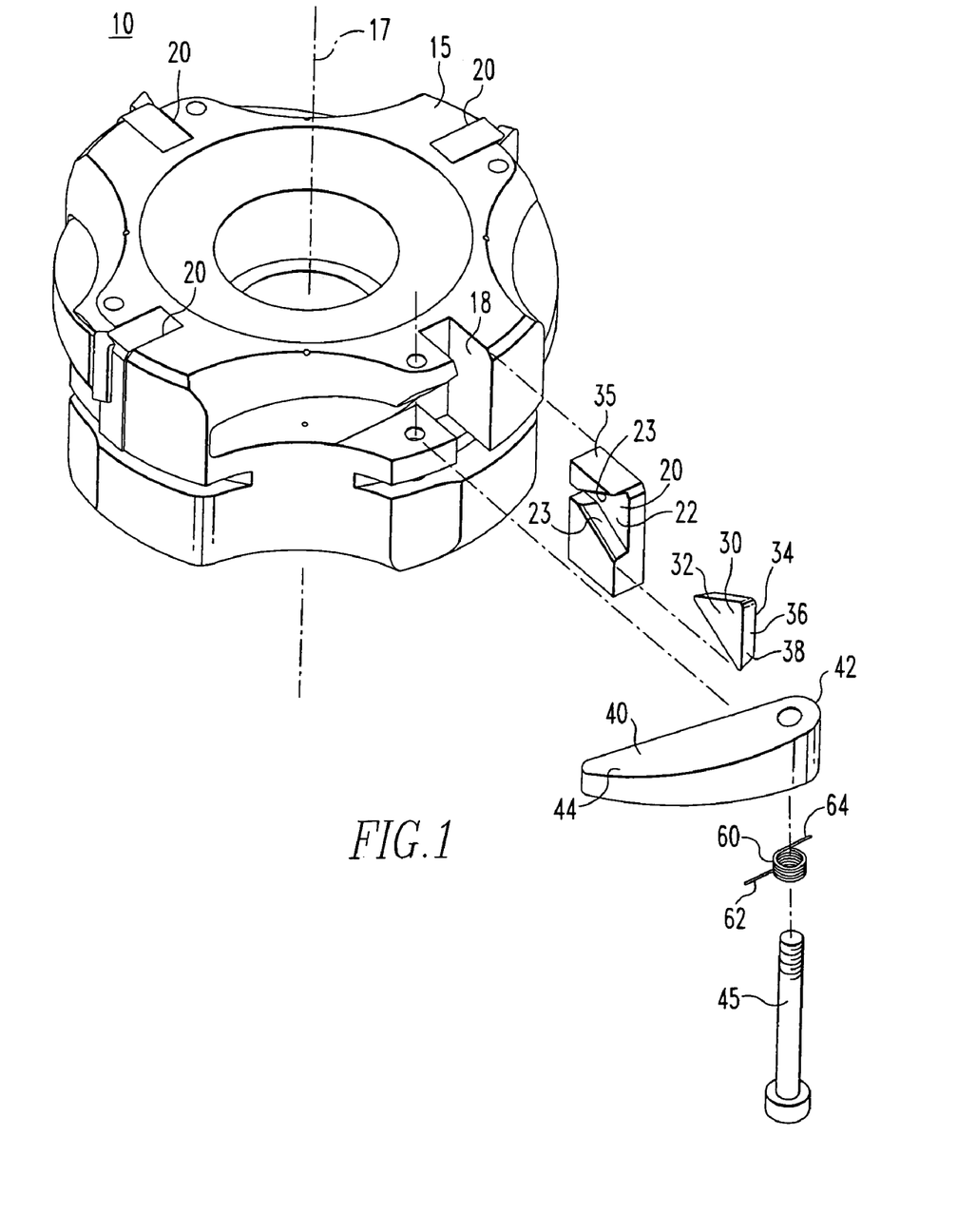
FIG. 1 illustrates a partially exploded isometric view of a milling cutter in accordance with the subject invention.

FIG. 1 illustrates an exploded isometric view of a milling cutter 10 having a body 15 with a centerline 17 and with a plurality of radially extending pockets 20 therein for receiving cutting inserts 30. In the embodiment discussed herein, the cutting insert 30 is placed with a shim 35 within an opening 18 within the toolholder body 15. The shim 35 includes a pocket 20 for accepting the cutting insert 30. While some toolholders utilize a shim 35 with a pocket 20 therein in which the cutting insert 30 rests, other toolholders utilize a pocket directly in the body of the toolholder without a shim or with a shim not having a pocket. Therefore, for purposes of this disclosure, while the figures illustrate a shim 35 with a pocket 20, it should be appreciated that the pocket 20 may exist directly within the toolholder body 15 with or without the existence, of a shim.

It should also be appreciated that while the milling cutter 10 has a plurality of identical pockets 20 with similar inserts 30 and/or shims 35 inserted therein, the subject invention will be discussed with respect only to a single pocket with the understanding that the remaining pockets may utilize such a clamping mechanism. A pocket 20 typically has a floor 22 and at least one wall 23 upon which the cutting insert 30 rests.

In general, a milling cutter body 15 may rotate at speeds in excess of 1,000 revolutions per minute. Therefore, it is important to securely retain the cutting insert 30 within the pocket 20 of the body 15.

To secure the insert 30 within the pocket 20, a lever, or cam 40, is pivotally mounted about a pivot 45 which is secured to the body 15 and adapted to hold the cutting insert 30 within the pocket 20.

Figure 2A:
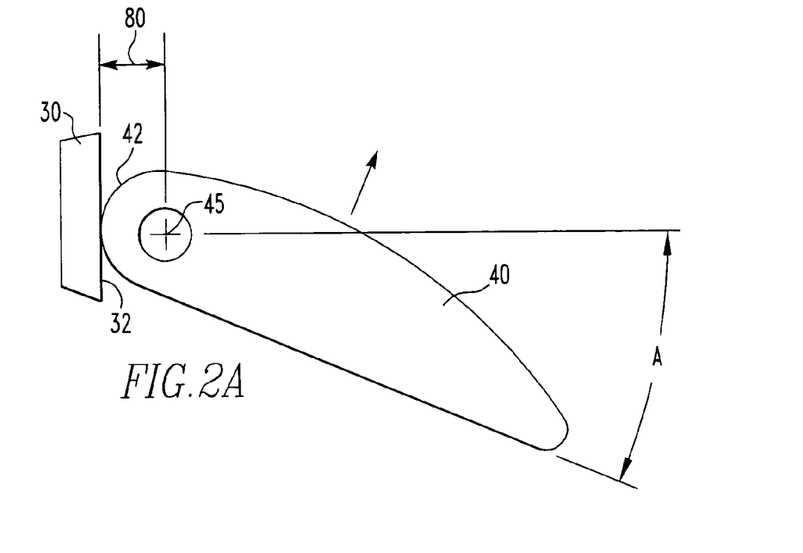
FIG. 2A is a simplified sketch of components of the milling cutter illustrated in FIG. 1 with the cam in the engaged position.

FIGS. 2A and 2B illustrate this principle. In particular, FIG. 2A is a sketch wherein the cam 40 has a cam surface 42. The cam is pivoted counter-clockwise about the pivot 45 to define a first position, wherein the cam surface, 42 contacts and clamps the cutting insert 30 within the pocket 20 (FIG. 1). The cam surface 42 contacts the insert 30 and may urge the insert 30 down or both down and rearwardly into the pocket 20. It should be appreciated that this counter-clockwise rotation is specific to this illustration and other designs may require clockwise rotation.

Figure 2B:
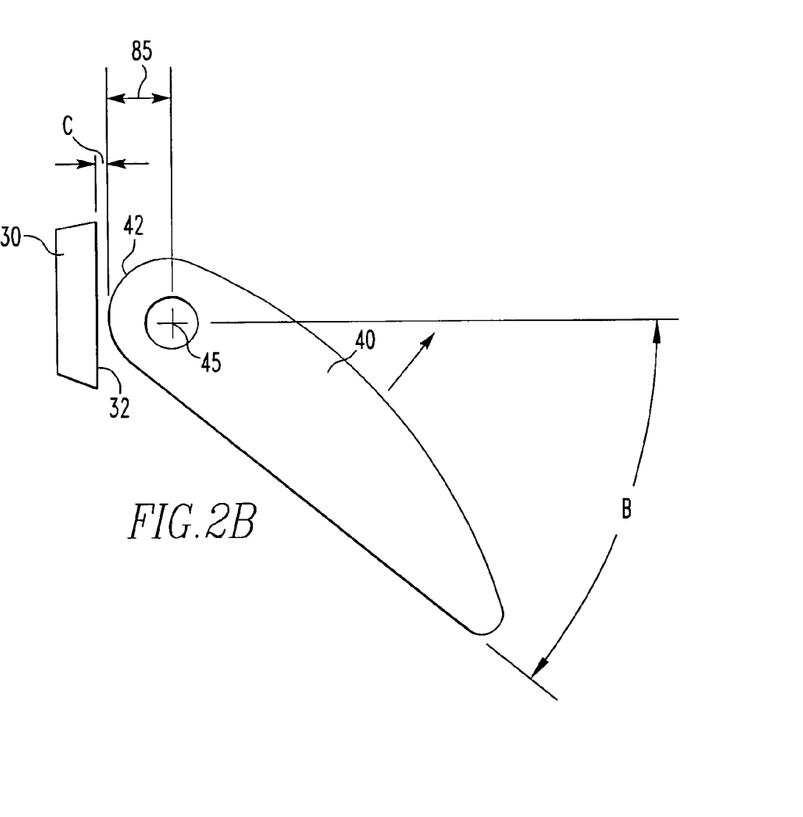
FIG. 2B is a simplified sketch of components illustrated in FIG. 1 showing the cam in the released position.

FIG. 2B illustrates a second position, wherein the cam surface 42 is spaced from the cutting insert 30, such that the cutting insert may be removed from the pocket 20 (FIG. 1). Additionally, in the second position, an insert may be placed within the pocket 20. It is significant that the distance between the cam surface 42 and the pivot 45 adjacent to the insert front face 32 increases as the cam 40 is rotated counterclockwise so that the cam may move from the disengaged second position to the engaged first position.

Figure 3:
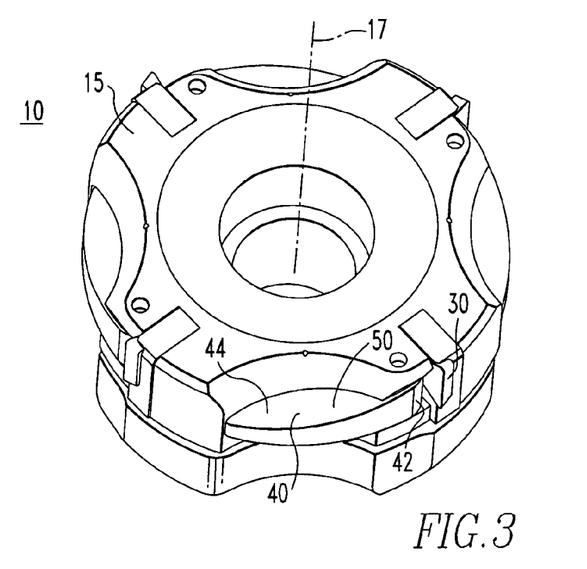
FIG. 3 illustrates an assembled isometric of the milling cutter illustrated in FIG. 1.
Figure 4:
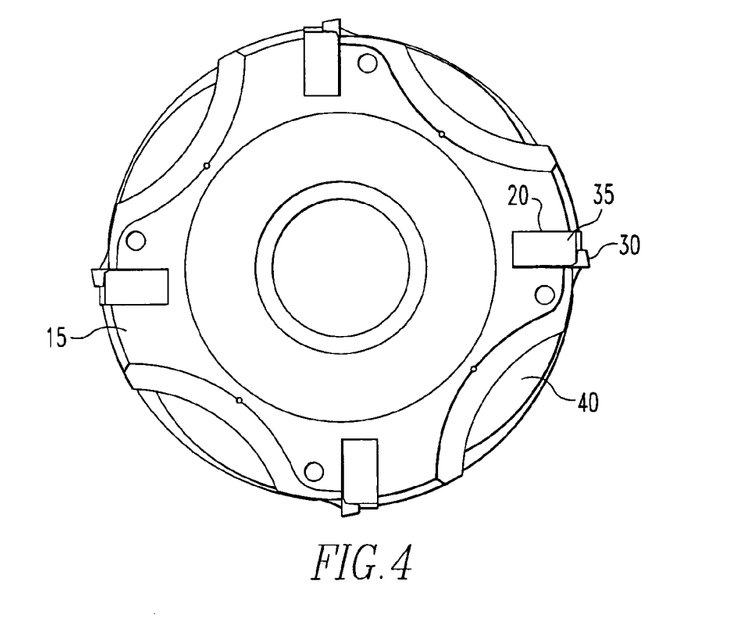
FIG. 4 is a front view of the milling cutter illustrated in FIG. 3.
Figure 5:
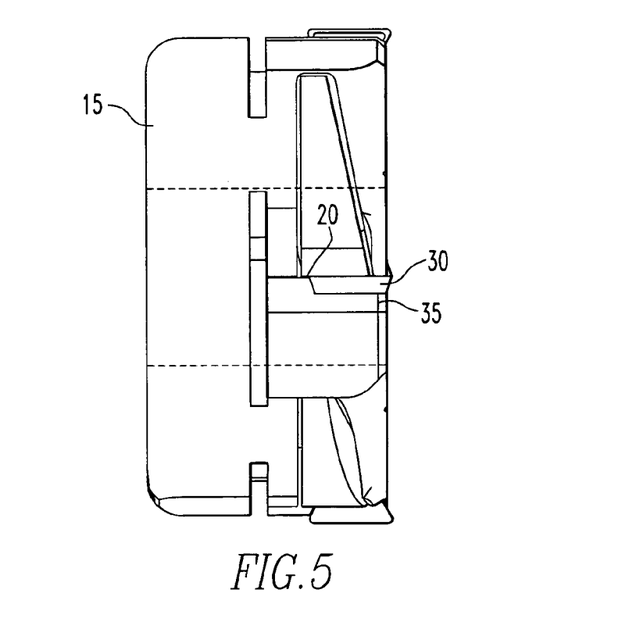
FIG. 5 is a side view of the milling cutter illustrated in FIG. 3.

FIGS. 3–5 illustrate an assembled version of the milling cutter illustrated in FIG. 1. Like parts have been numbered identically and, once again, only a single pocket 20 has been identified.

FIG. 1 also illustrates the cutting insert 30 with a front face 32, a back face 34 and a side wall 36. A cutting edge 38 is defined at the intersection of the front face 32 and the side wall 36. It should be appreciated that while FIG. 1 illustrates a triangular shaped cutting insert 30, the subject invention should in no way be limited to such a geometry and it should be obvious to those skilled in the art of machining that any number of different insert shapes may be utilized for the subject invention.

Figure 6:
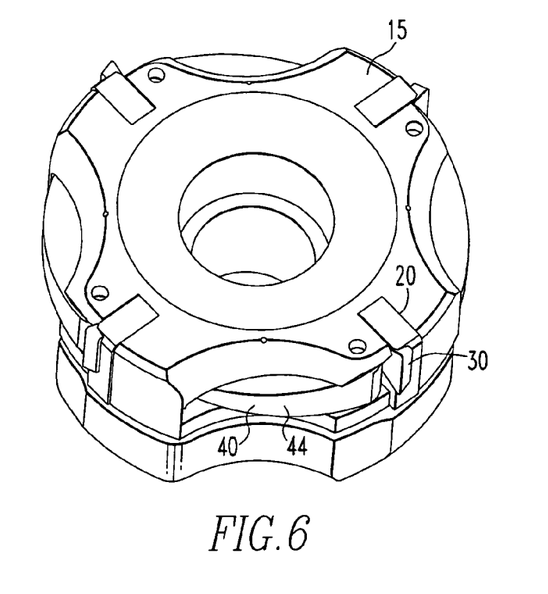
FIG. 6 is an isometric view similar to that illustrated in FIG. 2 but with a cam retracted within the cutter body to release a cutting insert.

The cam 40 may include a cam arm 44 such that, in the cam's first position, illustrated in FIG. 3, the cam arm 44 protrudes from the toolholder body 15, while in the cam's second position, as illustrated in FIG. 6, the cam arm 42 is retracted within the toolholder body 15. By design, a user may urge the cam arm 44 toward the body 15 to move the cam into the second position and permit a cutting insert 30 to be removed from or inserted within the pocket 20 of the toolholder body 15.

Briefly directing attention to FIG. 3, the body 15 of the milling cutter 10 includes a recessed portion 50 in the region of the cam 40 such that the cam arm 44 is exposed. By exposing the cam arm 44, a user may easily move the cam 40 from the first position, wherein the cam 40 protrudes from the toolholder body 15 and wherein the cam surface 42 contacts the cutting insert 30 to retain it within the pocket 20 to the second position (FIG. 6) where the cam 40 is in a generally retracted position wherein the cam surface 42 is separated from the cutting insert 30 such that the cutting insert 30 may be removed from the pocket 20. As a result of the recess 50, it is possible for a user to simply push the cam 44 such that the cam 40 moves from the first position, illustrated in FIG. 3, to the second position illustrated in FIG. 6 thereby releasing the cutting insert 30.

Briefly returning to FIG. 1, the pivot 45 may be comprised of a pivot pin 45, wherein the pivot pin 45 is secured to the toolholder body 15. This may be accomplished, for example, by threading the ends of the pivot pin 45 so that it threadingly mates with an associated threaded bore in the body 15 or by securing the pivot pin 45 to the body 15 through a press fit of the pivot pin 45 within the body 15.

Figure 7:
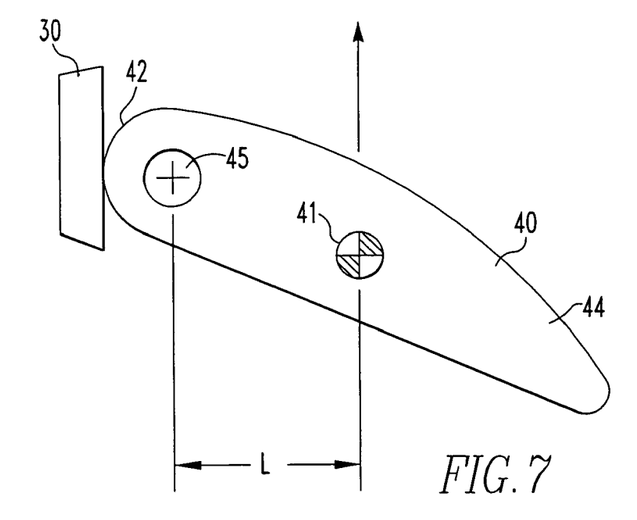
FIG. 7 is a simplified sketch similar to that shown in FIG. 2A but illustrating the mechanism by which the cam is biased into the first position.

Directing attention to FIGS. 3 and 7, a typical milling cutter 10 may rotate about its centerline 17 at speeds in excess of 1,000 RPMs. When subjected to rotation and with the cam arm 44 oriented such that the arm will be influenced by the centrifugal force of such rotation, the subject invention provides an increased clamping force on the insert 30 as the rotational speed of the milling cutter 10 increases. In particular, the center of gravity is indicated by reference number 41. When the insert 30 is oriented in a direction radial to the direction of rotation such as that illustrated in FIG. 1, then although the cutting insert 30 is subjected to centrifugal force urging the cutting insert away from the body 15 of the milling cutter 10, the cam 40 is also subjected to centrifugal force such that the center of gravity 41 operating at a distance L from the pivot 45 acts to urge the cam surface 42 against the surface of the cutting insert 30 to increase the clamping force exerted by the cam 40. For example, at a rotational speed of 1,000 RPMs, the force exerted upon the insert 30 by the cam 40 may be in excess of 1,000 lb. As the rotational speed of the milling cutter 10 increases so does the centrifugal force acting upon the arm 40 and the force acting upon the insert 30.

It should be noted that a typical cutting insert may be made of hard material such as ceramic or cemented carbide, while at the same time the clamp 40 and the insert shim 35 may be made of a hardened steel or other hardened material such that once the cam 40 contacts the insert 30, there is very little, if any, deformation among these elements and the entire force generated by the cam 40 translates directly into a clamping force securing the cutting insert 30 within the pocket 20.

While what has so far been discussed is the use of the rotation of the milling cutter 10 to produce centrifugal force against the cam 40 to urge and retain the cam 40 within the first position, it is entirely possible to provide a toolholder which does not depend upon centrifugal force to retain the cam 40 in a clamped position.

Figure 8:
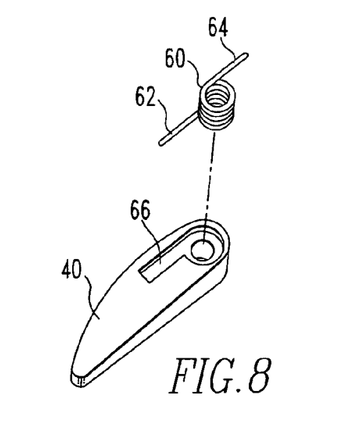
FIG. 8 is an exploded partial isometric view of the cam utilizing a torsion spring to urge the cam to the first position.

Directing attention to FIGS. 1 and 8, it is entirely possible to mechanically bias the cam 40 to the first position. In one such embodiment, a torsion spring 60 having a first end 62 and a second end 64 is mounted about the pivot pin 45 such that the first end 62 contacts the cam 40 and the second end 64 contacts the toolholder body 15 to bias the cam 40 toward the first position. The cam 40 may include a cutout 66 which generally conforms to the shape of the torsion spring 60 and engages the first end 62 of the torsion spring 60. Just as before the second end 64 of the torsion spring 60 engages the toolholder body 15 such that the cam 40 is biased toward the first position.

Figure 9:
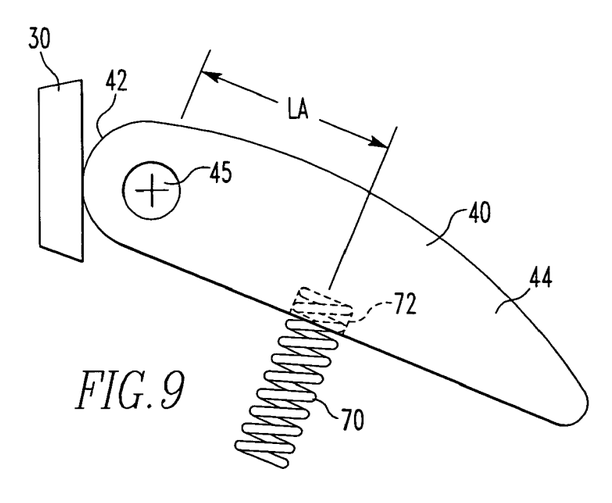
FIG. 9 is a simplified sketch similar to that illustrated in FIG. 2A but illustrating the use of a coil spring to urge the cam to a first position.

In another embodiment, illustrated schematically in FIG. 9, a coil spring 70 may be positioned between the cam arm 44 and the toolholder 10 (FIG. 1) at a distance LA away from the pivot 45 such that the cam 40 is biased in the first position. As illustrated in FIG. 9, the cam 40 may have a bore 72 extending therethrough to accept one end of the coil spring 70. It is also possible that the toolholder 10 have a similar bore (not shown) to accept the other end of the coil spring 70.

The size and/or stiffness of the spring utilized to bias the cam 40 to the first position may be selected to satisfy different criteria. When, as illustrated in FIG. 1, the toolholder 10 is intended to be rotated at a relatively high speed and the centrifugal force produced as a result will be sufficient to retain the cam 40 against the cutting insert 30, then the spring, such as the torsional spring 60 may be sized so that the cam arm 44 may be easily moved between the first and the second positions to insert or to remove the cutting insert 30. Under these circumstances, the spring is not intended to retain the cutting insert 30 in a clamped position for an actual machining operation. On the other hand, in the event it is desired to supplement the clamping force produced by the rotation of the milling cutter 10 or to provide the entire clamping force imparted by the cam 40 to the cutting insert 30, the size and/or stiffness of the spring may be increased such that the force coupled with the lever arm provides a moment about the pivot pin 45 thereby urging the cam surface 44 against the cutting insert 30. Oftentimes a hold-down force as low as 20 lbs. may be a sufficient retention force for the insert 30 within the pocket 20 to perform a typical machining operation. Under those circumstances it is entirely possible to size a spring, such as spring 70, such that the force translated to the cam surface 42 is sufficient to hold the cutting insert 30 within the pocket 20.

Returning to FIGS. 2A and 2B, in the current embodiment the angular range of travel of the cam arm 40 from the first position illustrated in FIG. 2A indicated by angle A to the second position wherein the cam surface 42 is distanced from the cutting insert 30 and represented by angle B is approximately 15 degrees. In the second position the clearance C between the cam surface 42 and the top of the insert 30 may be approximately 0.015 inches. Therefore, stated differently, the cam surface 42 has a profile such that the distance 80 between the pivot pin 45 and the cam surface 42 adjacent to the cutting insert 30 is approximately 0.015 inches less in the second position than in the first position. The distance between the pivot pin 45 and the cam surface 42 should increase as the cam 40 is rotated counterclockwise to the "locked" first position to account for manufacturing tolerances. It is also important to note that because the cam is used as a lever, the cam surface 42 must always bear down against the insert 30. The increasing distance between the cam surface 42 and the pivot 45 in the region of the cutting insert 30 limits the rotation of the cam 40 because once the cam surface 42 contacts the insert 30, further rotation of the cam 40 in the counterclockwise direction is not possible.

Figure 10A:
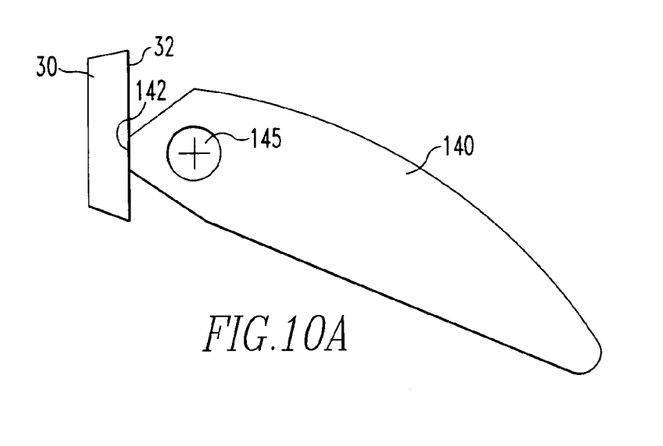
FIG. 10A is a simplified sketch of an alternate embodiment of the components illustrated in FIG. 1 showing the lever in the engaged position.

FIG. 10A illustrates a lever having a surface 142, similar to cam surface 42. The lever 140 is pivoted counter-clockwise about a pivot 145 to define a first position, wherein the surface 142 contacts and clamps the cutting insert 30 within the pocket 20 (FIG. 1). The surface 142 contacts the insert 30 and may urge the insert 30 down or both down and rearwardly into the pocket 20. It should be appreciated that this counter-clockwise rotation is specific to this illustration and other designs may require clockwise rotation. In this illustration, the surface 142 is not a cam surface but may be relatively flat or cylindrical.

Figure 10B:
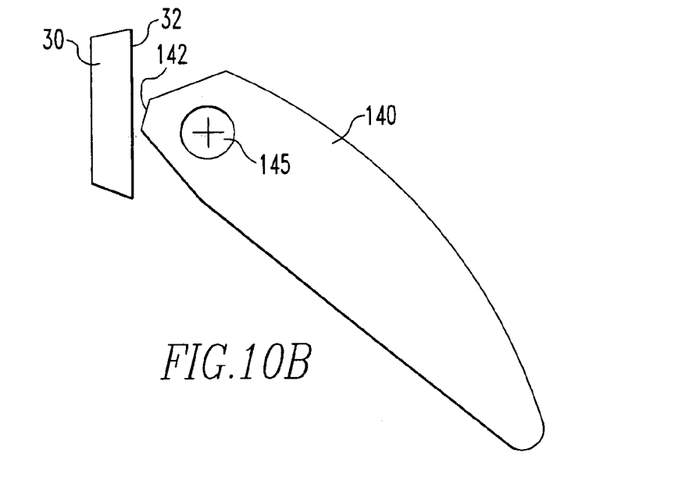
FIG. 10B is a simplified sketch of an alternate embodiment of the components illustrated in FIG. 1 showing the lever in the released position.

FIG. 10B illustrates a second position, wherein the surface 142 is spaced from the cutting insert 30, such that the cutting insert 30 may be removed from the pocket 20 (FIG. 1). Additionally, in the second position, an insert may be placed within the pocket 20. It is significant that the distance between the surface 142 and the pivot 145 adjacent to the insert front face 32 increases as the lever 140 is rotated counterclockwise so that the lever 140 may move from the disengaged second position to the engaged first position. So long as there is sufficient clearance between the surface 142 and the top face 32 of the insert 30 when the lever 140 travels between the second position to the first position, until the surface 142 engages the insert 30, the surface need not be limited to any particular geometry.

Figure 11:
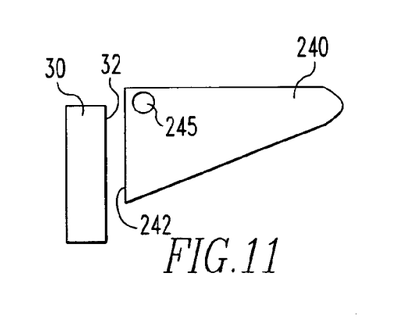
FIG. 11 is a simplified sketch of another embodiment of the components illustrated in FIG. 1 showing the lever in the released position.

FIG. 11 illustrates yet another embodiment wherein the surface 242 of lever 240 is spaced from the cutting insert 30, such that the cutting insert 30 may be removed from the pocket 20 (FIG. 1). The lever 240 may be rotated clockwise about pivot 245 until the surface 242 engages the top face 32 of the insert 30.

Just as in previous embodiments, each of the embodiments illustrated in FIGS. 10-11 may be biased to the first engaged position by a spring or may be dynamically biased by rotation of a rotatable toolholder of which they are a part.

The subject invention is also directed to a method for securing the cutting insert 30 into the pocket 20 of a toolholder 10. The pocket 20 has a floor 22 an at least one wall 23 and the cutting insert 30 has a top surface 32 and a bottom surface 34. The cutting insert 30 is positioned within the pocket 20 of the toolholder 10 such that the bottom surface 34 of the cutting insert 30 is against the floor 22 and at least one wall 23 of the pocket 20. The lever 40 is pivotally mounted to the toolholder body 15 and is rotated to a first position against the top surface 32 of the cutting insert 30 to urge the cutting insert 30 against the pocket floor 22 and at least one wall 23 and thereby secure the cutting insert 30 within the pocket 20. The lever 40 is biased in the first position to secure the cutting insert 30. This may be achieved by a mechanical bias, such as through the use of mechanical springs, or may be achieved through a dynamic bias.

In a dynamic bias, the lever 40 further includes a lever arm 44 and the center of gravity 41 of the lever 40 is positioned away from the pivot 45. The toolholder 10 is rotated. such that lever arm 44 is urged outwardly and the lever 40 is further urged first position.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A toolholder comprising:
    a) a body having a pocket therein for receiving a cutting insert and
    b) a lever pivotally mounted about a pivot on the body wherein the lever is capable of rotation only about the fulcrum; and adapted to hold the cutting insert within the pocket.

2. The toolholder according to claim 1 wherein the pocket has a floor and a back wall and wherein the lever is positioned to urge the cutting insert simultaneously against the floor and against the back wall of the pocket.

3. The toolholder according to claim 1, wherein the lever may be pivoted such that in a first position the lever contacts and clamps the cutting insert within the pocket and in a second position the lever is spaced from the cutting insert such that a cutting insert may be inserted within or removed from the pocket.

4. The toolholder according to claim 1, wherein the lever is a cam with a cam surface and a cam arm.

5. The toolholder according to claim 4, wherein in the cam first position the cam arm protrudes from the toolholder and in the cam second position the cam arm is retracted within the toolholder such that a user may urge the cam arm toward the body to move the cam into the second position and permit a cutting insert to be removed from or inserted within the pocket of the toolholder.

6. The toolholder according to claim 4 wherein the cam arm has a center of gravity spaced from the pivot such that centrifugal force may urge the cam arm away from the body to more securely clamp the cutting insert within the pocket.

7. The toolholder according to claim 1, further including a pivot pin about which the lever pivots, wherein the pivot pin is secured to the toolholder body.

8. The toolholder according to claim 3, wherein while stationary the lever is biased toward the first position.

9. The toolholder according to claim 8 wherein the lever is biased by a spring.

10. The toolholder according to claim 9 wherein the spring is a torsion spring.

11. The toolholder according to claim 10 wherein the torsion spring has a first end and a second end and wherein the torsion spring is mounted about the pivot such that the first end contacts the lever and the second end contacts the toolholder to bias the lever toward the first position.

12. The toolholder according to claim 11 wherein the lever further includes a recess to enclose the torsion spring.

13. The toolholder according to claim 9 wherein the spring is a coil spring.

14. The toolholder according to claim 13 wherein the coil, spring is positioned between the lever arm and the toolholder at a location away from the pivot such that the lever is biased in the first position.

15. The toolholder according to claim 1 further including a shim placed adjacent to the cutting insert within the pocket.

16. A rotatable toolholder for holding a cutting insert having a front face, a back face and a side wall that define a cutting edge at an intersection of the front face and the side wall, wherein the toolholder holds the cutting insert such that the cutting edge of the cutting insert protrudes from the toolholder comprising:
   a) a body having at least one radially extending pocket to accept a cutting insert and
   b) a lever pivotally mounted to the body through a pivot, wherein the lever is adapted to hold the cutting insert within the pocket and is capable of rotation only about the fulcrum.

17. The toolholder according to claim 16, wherein the lever has a lever and with a center of gravity spaced from the pivot such that centrifugal force may urge the center of gravity of the lever arm away from the body and act to more securely clamp the cutting insert within the pocket.

18. The toolholder according to claim 16, wherein in the stationary position of the toolholder the lever is biased to hold the cutting insert within the pocket.

19. A method for securing a cutting insert into the pocket of a toolholder, wherein the pocket has a floor and one or more walls and the cutting insert has a top and bottom surface, comprising the steps of:
   a) positioning the cutting insert within the pocket of the toolholder such that the bottom surface of the cutting insert is against the floor and one or more walls of the pocket; and
   b) rotating a lever pivotally mounted to the toolholder body wherein the lever is capable of rotation only about the fulcrum to a first position about a pivot fulcrum against the top surface of the cutting insert to urge the cutting insert against the floor and one or more walls of the pocket and thereby secure the cutting insert within the pocket, wherein the lever is capable of rotation only about the fulcrum and wherein the lever has a first end adjacent to the pocket for contacting the cutting insert and a second end opposite thereto, and wherein the pivot fulcrum is substantially closer to the first end than to the second end.

20. The method according to claim 19 further including the step of biasing the lever toward the first position.

21. The method according to claim 20 wherein the lever further includes a lever and the center of gravity of the lever is positioned away from the pivot and further including the step of rotating the toolholder such that lever and is urged outwardly and the lever is further urged into the first position.

* * * * *